United States Patent
Sahoo et al.

(10) Patent No.: US 9,363,845 B1
(45) Date of Patent: Jun. 7, 2016

(54) APPARATUS AND METHOD FOR CARRIER AGGREGATION AND FAST NETWORK SWITCHING WITH A SINGLE-BASEBAND-MODEM, CARRIER-AGGREGATION-CAPABLE WIRELESS-COMMUNICATION DEVICE

(71) Applicant: MOTOROLA SOLUTIONS, INC, Schaumburg, IL (US)

(72) Inventors: Brundaban Sahoo, Vernon Hills, IL (US); Mike H Baker, Elmhurst, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 42 days.

(21) Appl. No.: 14/587,035

(22) Filed: Dec. 31, 2014

(51) Int. Cl.
*H04W 4/00* (2009.01)
*H04W 76/04* (2009.01)
*H04L 5/00* (2006.01)

(52) U.S. Cl.
CPC ............. *H04W 76/04* (2013.01); *H04L 5/0007* (2013.01)

(58) Field of Classification Search
CPC .............................. H04W 76/04; H04L 5/0007
USPC ...................... 455/77, 422.1, 552.1
See application file for complete search history.

(56) References Cited

U.S. PATENT DOCUMENTS

| | | | |
|---|---|---|---|
| 8,150,392 B1 | 4/2012 | McConnell et al. | |
| 8,200,214 B2 | 6/2012 | Chutorash et al. | |
| 8,406,741 B2 | 3/2013 | Kang et al. | |
| 8,472,999 B2 | 6/2013 | Zhang | |
| 8,576,901 B2 | 11/2013 | Tat et al. | |
| 8,781,475 B1 | 7/2014 | McKeeman et al. | |
| 2011/0269503 A1 | 11/2011 | Park et al. | |
| 2012/0198077 A1 | 8/2012 | Wei | |
| 2014/0295831 A1 | 10/2014 | Karra et al. | |
| 2015/0105120 A1* | 4/2015 | Lim | H04W 36/0022 455/552.1 |
| 2015/0171914 A1* | 6/2015 | Desclos | H04B 1/0057 455/77 |

FOREIGN PATENT DOCUMENTS

| | | |
|---|---|---|
| GB | 2500583 A | 10/2013 |
| WO | 2013192601 A2 | 12/2013 |
| WO | 2014024174 A2 | 2/2014 |

* cited by examiner

*Primary Examiner* — Amancio Gonzalez

(57) ABSTRACT

Disclosed herein are systems and methods for carrier aggregation and fast network-switching with a single-baseband modem, carrier-aggregation-capable wireless-communication device (WCD). One embodiment takes the form of a system that includes a first RF integrated circuit (RFIC), a second RFIC, a baseband processor coupled to the first and second RFICs, a first carrier-aggregation circuit, a fast-network-switching connection manager coupled to the baseband processor, and a mode controller coupled to the baseband processor and to the fast-network-switching connection manager. The mode controller is configured to selectively place the wireless-communication device in a carrier-aggregation mode or in a fast-network-switching mode. In the carrier-aggregation mode, the WCD is operable to conduct carrier aggregation using at least the first carrier-aggregation circuit. In the fast-network-switching mode, the WCD is operable to conduct fast network switching using the fast-network-switching manager.

20 Claims, 11 Drawing Sheets

US 9,363,845 B1

APPARATUS AND METHOD FOR CARRIER AGGREGATION AND FAST NETWORK SWITCHING WITH A SINGLE-BASEBAND-MODEM, CARRIER-AGGREGATION-CAPABLE WIRELESS-COMMUNICATION DEVICE

BACKGROUND OF THE INVENTION

It is important for people to have connectivity to communication services (e.g., telephony, data services, and the like). To facilitate communication between user equipment and various radio access networks (RANs), network entities such as eNodeBs, base stations, and the like typically operate to establish a link between a given wireless-communication device (WCD) (e.g., a handheld mobile radio, a vehicular subscriber modem) and a given network resource, typically using a standard protocol for over-the-air communication, an example of which is 3GPP's Long Term Evolution (LTE), which is one example protocol for a type of wireless communication known as orthogonal frequency division multiplex (OFDM) communication. In addition to mobile radios, some examples of commonly used WCDs include cell phones, smartphones, tablets, notebook computers, laptop computers, and the like. And certainly other examples could be listed.

In a typical arrangement, a WCD includes one or more radio-frequency integrated circuits (RFICs) via which the WCD is able to engage in wireless communication via one or more wireless-communication bands associated with one or more wireless networks. Moreover, one bandwidth-increasing LTE technology is known as carrier aggregation, according to which a network entity assigns multiple component carriers to a given WCD at a given time, and a carrier-aggregation circuit in the WCD functions to combine data from the multiple component carriers into a single data stream for processing by the device. It also often occurs that a given WCD makes a determination, either programmatically or due to receiving a (local and/or remote) instruction to transition from communicating with a given wireless network via a given band to communicating with another wireless network via another band.

Accordingly, there is a need for the present apparatus and method for carrier aggregation and fast network switching with a single-baseband-modem, carrier-aggregation-capable WCD.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
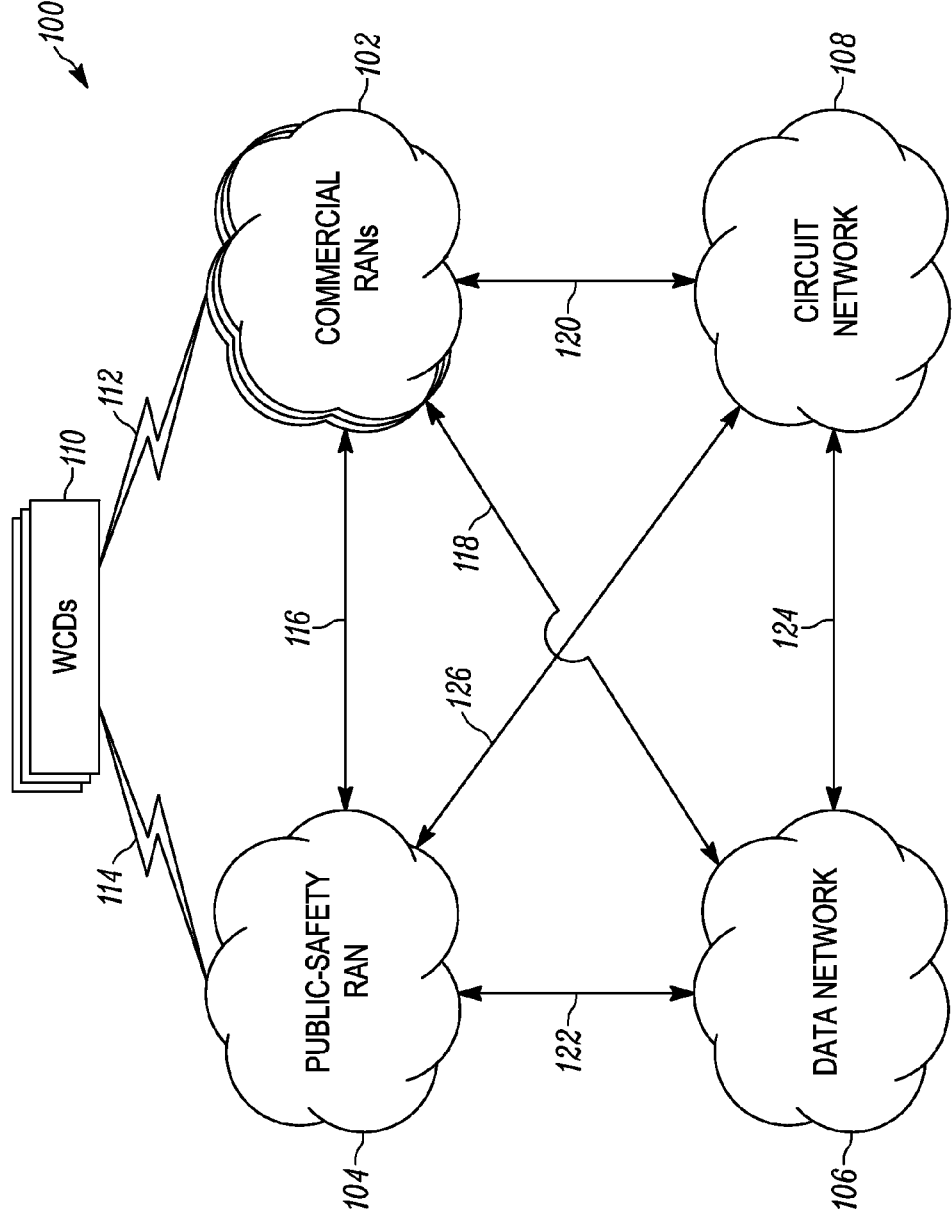
FIG. 1 depicts an example communication system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and apparatus for carrier aggregation and fast network-switching with a single-baseband modem, carrier-aggregation-capable wireless-communication device. One embodiment takes the form of a system or, an apparatus that includes a first RFIC, a second RFIC, a baseband processor coupled to the first and second RFICs, a first carrier-aggregation circuit, a fast-network-switching connection manager coupled to the baseband processor, and a mode controller coupled to (i) the baseband processor and (ii) the fast-network-switching connection manager. The mode controller is configured to selectively place the wireless-communication device in a carrier-aggregation mode or in a fast-network-switching mode. In the carrier-aggregation mode, the wireless-communication device is operable to conduct carrier aggregation using at least the first carrier-aggregation circuit with respect to communications that are associated with a first network credential and that are conducted via at least the first RFIC. In the fast-network-switching mode, the wireless-communication device is operable to conduct fast network switching using the fast-network-switching manager with respect to (i) communications that are associated with the first network credential and that are conducted via the first RFIC and (ii) communications that are associated with a second network credential and that are conducted via the second RFIC.

Another embodiment takes the form of a process carried out by a wireless-communication device that includes a first RF integrated circuit (RFIC), a second RFIC, a baseband processor coupled to the first and second RFICs, a first carrier-aggregation circuit, a fast-network-switching connection manager coupled to the baseband processor, and a mode controller coupled to (i) the baseband processor and (ii) the fast-network-switching connection manager. The process includes using the mode controller to selectively place the wireless-communication device in a carrier-aggregation mode or in a fast-network-switching mode. The process also includes, if the mode controller places the wireless-communication device in the carrier-aggregation mode, responsively disabling the fast-network-switching connection manager and enabling at least the first carrier-aggregation circuit to be operable to conduct carrier aggregation with respect to communications that are associated with a first network credential and that are conducted via at least the first RFIC. The process also includes, if the mode controller places the wireless-communication device in the fast-network-switching mode, responsively enabling the fast-network-switching connection manager to be operable to conduct fast network switching with respect to (i) communications that are associated with the first network credential and that are conducted via the first RFIC and (ii) communications that are associated with a second network credential and that are conducted via the second RFIC. The process also includes communicating via at least the first RFIC according to the selected mode.

Another embodiment takes the form of a process carried out by a computing and communication device that includes a wireless-communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments. Furthermore, this flexibility and cross-applicability of embodiments is present in spite of the use of slightly different language (e.g., process, method, steps, functions, set of functions, and the like) to describe and or characterize such embodiments.

In at least one embodiment, the baseband processor comprises a Long Term Evolution-Advanced (LTE-A) processor.

In at least one embodiment, the wireless-communication device further comprises a host processor coupled to the baseband processor. In at least one such embodiment, the host processor comprises the fast-network-switching connection manager and the mode controller.

In at least one embodiment, the wireless-communication device further comprises a plurality of RF front ends that are each configured for communication via a respective band and coupled to one or both of the first and second RFICs.

In at least one embodiment, the wireless-communication device further comprises (i) an RF-connection circuit and (ii) a plurality of RF front ends that are each configured for communication via a respective band and coupled to one or both of the first and second RFICs via the RF-connection circuit. In at least one such embodiment, each RF front end in a first set of the RF front ends is coupled to both the first and second RFICs via the RF-connection circuit, and at any given time, each RF front end in the first set of RF front ends has an active connection via the RF-connection circuit to one but not both of the first and second RFICs. The mode controller is coupled to the RF-connection circuit and is further configured to selectively control whether each respective RF front end in the first set of RF front ends has an active connection at a particular time to the first RFIC or instead to the second RFIC.

In at least one embodiment, the mode controller selectively places the wireless-communication device in the carrier-aggregation mode or in the fast-network-switching mode based at least in part on a received indication. In at least one embodiment, the received indication comprises a selection of a home network for the wireless-communication device. In at least one embodiment, the wireless-communication device receives the indication from a user interface. In at least one embodiment, the wireless-communication device receives the indication from an infrastructure. In at least one embodiment, the wireless-communication device receives the indication from a network.

In at least one embodiment, the mode controller iteratively places the wireless-communication device in the carrier-aggregation mode or in the fast-network-switching mode based at least in part on a dynamic mode-selection algorithm. In at least one such embodiment, the dynamic mode-selection algorithm takes as inputs one or more of: relative band coverage, relative signal strength of multiple networks, current in-incident or not-in-incident status, mission-critical data-throughput requirement for one or more applications, mission-critical data-throughput requirement for one or more public-safety applications, maintenance of session continuity during network transition; a time of day; a location of the wireless-communication device; a mobility pattern of the wireless-communication device; respective security credentials supported by each of the first and second RFICs; respective sets of wireless bands supported by each of the first and second RFICs; respective applications supported by each of the first and second RFICs; applications supported by one or more connected networks; a network load of one or more of the connected networks; a cost of operating on one or more of the connected networks; relative ratio of commercial-network coverage to public-safety-network coverage; and a selection of a network from among the connected networks as a home network for the wireless-communication device.

In at least one embodiment, the first RFIC comprises the first carrier-aggregation circuit, and in the carrier-aggregation mode, the wireless-communication device is operable to conduct carrier aggregation using the first carrier-aggregation circuit with respect to communications that are associated with the first network credential and that are conducted via the first RFIC. In at least one such embodiment, the baseband processor comprises a second carrier-aggregation circuit, and in the carrier-aggregation mode, the wireless-communication device is operable to conduct carrier aggregation using the second carrier-aggregation circuit with respect to (i) communications aggregated by the first carrier-aggregation circuit, and (ii) communications that are associated with the first network credential and that are conducted via the second RFIC.

In at least one embodiment, the baseband processor comprises the first carrier-aggregation circuit, and in the carrier-aggregation mode, the wireless-communication device is operable to conduct carrier aggregation using the first carrier-aggregation circuit with respect to (i) communications that are associated with the first network credential and that are conducted via the first RFIC and (ii) communications that are associated with the first network credential and that are conducted via the second RFIC.

In at least one embodiment, the wireless-communication device further comprises a first network-credential module providing the first network credential and a second network-credential module providing the second network credential. In at least one such embodiment, the first network-credential module comprises a first subscriber identity module (SIM) and the second network-credential module comprises a second SIM.

In at least one embodiment, the wireless-communication device further comprises a network-credential module providing both the first network credential and the second network credential. In at least one such embodiment, the network-credential module comprises a subscriber identity module (SIM).

In at least one embodiment, being operable to conduct carrier aggregation comprises being operable to conduct carrier aggregation between a first commercial band and a second commercial band.

In at least one embodiment, being operable to conduct carrier aggregation comprises being operable to conduct carrier aggregation between a commercial band and a public-safety band.

In at least one embodiment, being operable to conduct fast network switching comprises being operable to conduct fast network switching between a first commercial band and a second commercial band.

In at least one embodiment, being operable to conduct fast network switching comprises being operable to conduct fast network switching between a commercial band and a public-safety band. In at least one embodiment, the wireless-communication device is homed on the public-safety band and has roaming access to the commercial band. In at least one embodiment, the wireless-communication device is homed on the commercial band and has roaming access to the public-safety band.

In at least one embodiment, being operable to conduct fast network switching comprises being operable to use a mobile-virtual-private-network (MVPN) connection to maintain session continuity during a fast-network-switching operation.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . . " And it is for reasons akin to brevity and clarity of presentation that this implied leading clause is not repeated ad nauseum in this detailed description.

Figure 2:
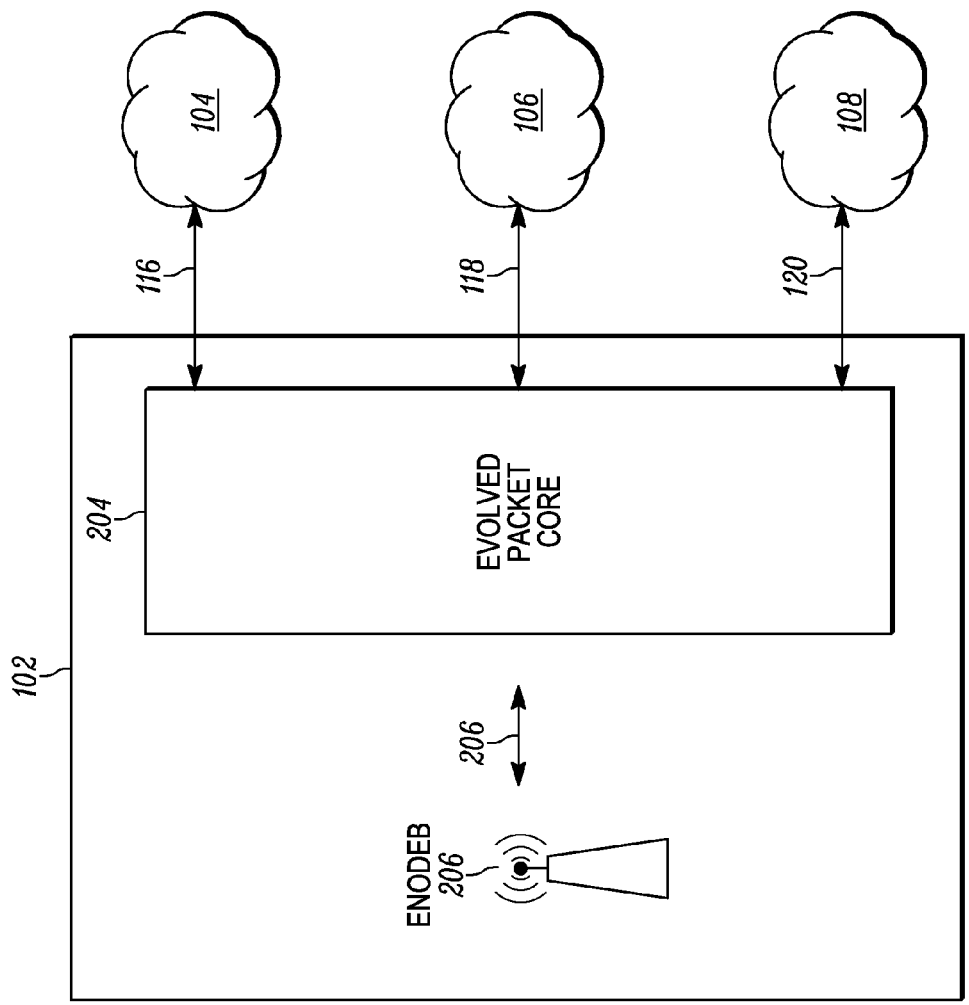
FIG. 2 depicts a further example of aspects of the communication system of FIG. 1, in accordance with an embodiment.
Figure 2:
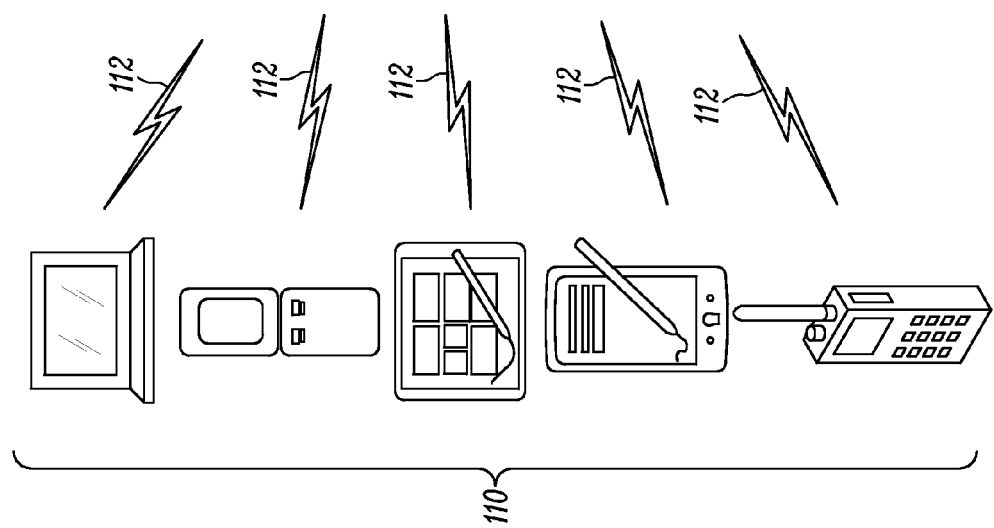

The next portion of this disclosure includes descriptions of FIGS. 1-2, which in general depict a communication system in which WCDs communicate via one or more radio access networks (RANs). It is explicitly noted that WCDs that communicate via one or more RANs may also be capable of communicating directly with one another in a manner known by those of skill in the relevant art. Furthermore, mobile radios that are capable of both direct-mode communication and RAN-based communication could certainly carry out and embody the present methods and apparatus, for which FIGS. 1-2 together help establish an operational context. Herein, many embodiments include reference to one or more networks; therefore, prior to describing these various embodiments, examples of such networks are described immediately below with reference to FIGS. 1-2.

FIG. 1 depicts an example communication system, in accordance with an embodiment. In particular, FIG. 1 depicts an example communication system 100 that includes one or more commercial RANs 102, a public-safety RAN 104, a data network 106, a circuit network 108, WCDs 110, and communication links 112-126.

In general, in at least one embodiment, each RAN 102 and the RAN 104 includes typical RAN elements such as base stations, base station controllers, routers, switches, and the like, arranged, connected, and programmed to provide wireless service to user equipment (e.g., WCDs 110) in a manner known to those of skill in the relevant art.

The public-safety RAN 104, an example implementation of which is discussed below in connection with FIG. 2, may include one or more packet-switched networks and/or one or more circuit-switched networks, and in general functions to provide one or more public-safety agencies with any necessary computing and communication needs. Thus, the public-safety RAN 104 may include a dispatch center communicatively connected with the data network 106 and also with the circuit network 108, for retrieving and transmitting any necessary public-safety-related data and communications. The public-safety RAN 104 may also include any necessary computing, data-storage, and data-presentation resources utilized by public-safety personnel in carrying out their public-safety functions. Moreover, the public-safety RAN 104 may include one or more network access servers (NASs), gateways, and the like for bridging communications to one or more other entities and/or networks, such as the commercial RANs 102, the data network 106, and the circuit network 108, as representative examples.

The data network 106 may be, include, or be a part of the global network of networks typically referred to as the Internet. The data network 106 may be a packet-switched network, and entities (i.e., servers, routers, computers, and the like) that communicate over the data network 106 may be identified by a network address such as an Internet Protocol (IP) address. Moreover, the data network 106 may include one or more NASs, gateways, and the like for bridging communications to one or more other entities and/or networks, such as the commercial RANs 102, the public-safety RAN 104, and the circuit network 108, as representative examples.

The circuit network 108 may be, include, or be a part of the circuit-switched telephone network commonly referred to as the public switched telephone network (PSTN), and in general functions to provide circuit-switched communications to various communication entities as is known in the relevant art. Moreover, the circuit network 108 may include one or more NASs, gateways, and the like for bridging communications to one or more other entities and/or networks, such as the commercial RANs 102, the public-safety RAN 104, and the data network 106, as representative examples.

The depicted example communication system 100 includes communication links 112-126, any one or more of which could include one or more wireless-communication links and/or one or more wired-communication links. In FIG. 1, the communication links 112 and 114 are depicted with respective lightning-bolt graphics; while this graphic typically denotes wireless communication, and does in this example as well, this is not to the exclusion of one or more of the other communication links 116-126 being or including wireless-communication links.

The WCDs 110 may be any suitable computing and communication devices configured to engage in wireless communication with one or both of one or more of the RANs 102 over the air interface 112 as is known to those in the art and the public-safety RAN 104 over the air interface 114 as is known to those in the art. Some example WCDs 110 are discussed below in connection with the various figures.

As can be seen in FIG. 1, the communication link 112 (as mentioned above) connects the commercial RANs 102 and the WCDs 110, the communication link 114 (as mentioned above) connects the public-safety RAN 104 and the WCDs 110, the communication link 116 connects the commercial RANs 102 and the public-safety RAN 104, the communication link 118 connects the commercial RANs 102 and the data network 106, the communication link 120 connects the commercial RANs 102 and the circuit network 108, the communication link 122 connects the public-safety RAN 104 and the data network 106, the communication link 124 connects the data network 106 and the circuit network 108, and the communication link 126 connects the public-safety RAN 104 and the circuit network 108. This arrangement is provided purely by way of example, as other arrangements could be implemented by those of skill in the relevant art in various different contexts.

FIG. 2 depicts a first example of aspects of the communication system of FIG. 1, in accordance with at least one embodiment. FIG. 2 depicts the communication system 100 of FIG. 1, though in more detail regarding some example WCDs 110 and an example commercial RAN 102, although a similar figure could be depicted with the example public-safety RAN 104 instead of the example commercial RAN 102. As shown, FIG. 2 depicts an example RAN 102 as including an eNodeB 202, which communicates directly or indirectly with an evolved packet core (EPC) 204 over a communication link 206. As is the case with each of the links mentioned above, and as is the case with any of the links mentioned anywhere else in this disclosure, the communication link 206 may be or include one or more wireless-communication links and/or one or more wired-communication links, as deemed suitable by those of skill in the relevant art in a given context.

In at least one embodiment, the eNodeB 202 includes the hardware and software (and/or firmware) necessary for the eNodeB 202 to function as an eNodeB, a NodeB, a base station, a base transceiver station (BTS), a WiFi access point, and/or the like, as known to those having skill in the relevant art. In some instances, the eNodeB 202 in the example RAN 102 also includes functionality typically associated in the art with entities that are often referred to by terms such as base station controllers (BSCs), radio network controllers (RNCs), and the like. Also, while one eNodeB 202 is depicted by way of example in FIG. 2, any suitable number of eNodeBs could be deployed as deemed suitable by those of skill in the relevant art.

In general, the eNodeB 202 is an entity that, on one side (i.e., the wireless-network side (interface)), engages in wireless communications over the air interface 112 with one or more WCDs 110 according to a protocol such as LTE or the like and, on the other side (i.e., the "backhaul" side), engages in communications with the EPC 204 via the communication link 206, to facilitate communications between various WCDs 110 and networks such as the networks 104, 106, and 108. In addition, eNodeBs, such as the eNodeB 202, can communicate directly with each other (i.e., other eNodeBs). Neighbor eNodeBs could pass information (info such as local loading and frequency bands available) directly to a serving eNodeB of a WCD 110, without having to communicate through the EPC 204.

The EPC 204 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the WCDs 110 via the eNodeB 202, and to bridge such wireless service with various transport networks. In general, a commercial RAN and a public-safely RAN may each provide wireless service according to a protocol such as LTE, WiFi, APCO P25, WCDMA, and/or the like. These examples are provided for illustration and not by way of limitation; moreover, those of skill in the art are aware of variations among different protocols and among different implementations of a given protocol, and of similarities across different protocols.

Before proceeding with the descriptions of FIGS. 3-13, it is noted that this disclosure references, among other aspects, wireless bands, RF integrated circuits (RFICs), RF front ends, and baseband processors. In many of the following figure descriptions, a limited number of wireless bands are described as being associated with, compatible with, or part of the RFICs and RF front ends. In some descriptions, the RFICs may be said to communicate via the wireless band. In certain cases a WCD may be said to connect to a certain band via a RFIC or an RF front end. These forms of descriptions are meant to convey the same concept (that a certain RFIC is employed to communicate using a certain band as dictated by an active RF front end), as will be appreciated by those in the art. In general, a single band corresponds with a single RF front end.

The various wireless bands are references to various radio spectrum frequency bands. A wireless band is a relatively small section of the spectrum of radio communication frequencies, in which channels are usually used or set aside for the same purpose. The limited number of RF front ends discussed in relation to each RFIC is not meant to indicate that the stated RF front ends are the only bands compatible with each RFIC. In many cases, the RFICs may contain the necessary hardware and configuration parameters to communicate via a large number of wireless bands (e.g., 8 or more wireless bands per RFIC corresponding to 8 or more RF front ends) and the WCD containing such RFICs would be configured to utilize (or at least to be able to utilize) these additional spectral resources. The relatively small number of RF front ends discussed herein is not meant to limit the form of the associated RFICs in any way. Moreover, in addition to the RFICs of the WCDs, this scalability extends to the RF front ends of WCDs as well. Examples of components in RF front ends of WCDs that can be band-specific in various different implementations include band-specific power amplifiers and filters in the transmit portion of the respective RF front ends. And certainly other examples could be listed as well. The conscious omission of greater numbers of RF front ends in the FIGs. and their corresponding descriptions is purely for the sake of visual simplicity and literary minimalism, respectively. Consequently, certain embodiments include RFICs that are able to communicate with more networks (via more spectra i.e., RF front ends) than are explicitly discussed herein.

Figure 3:
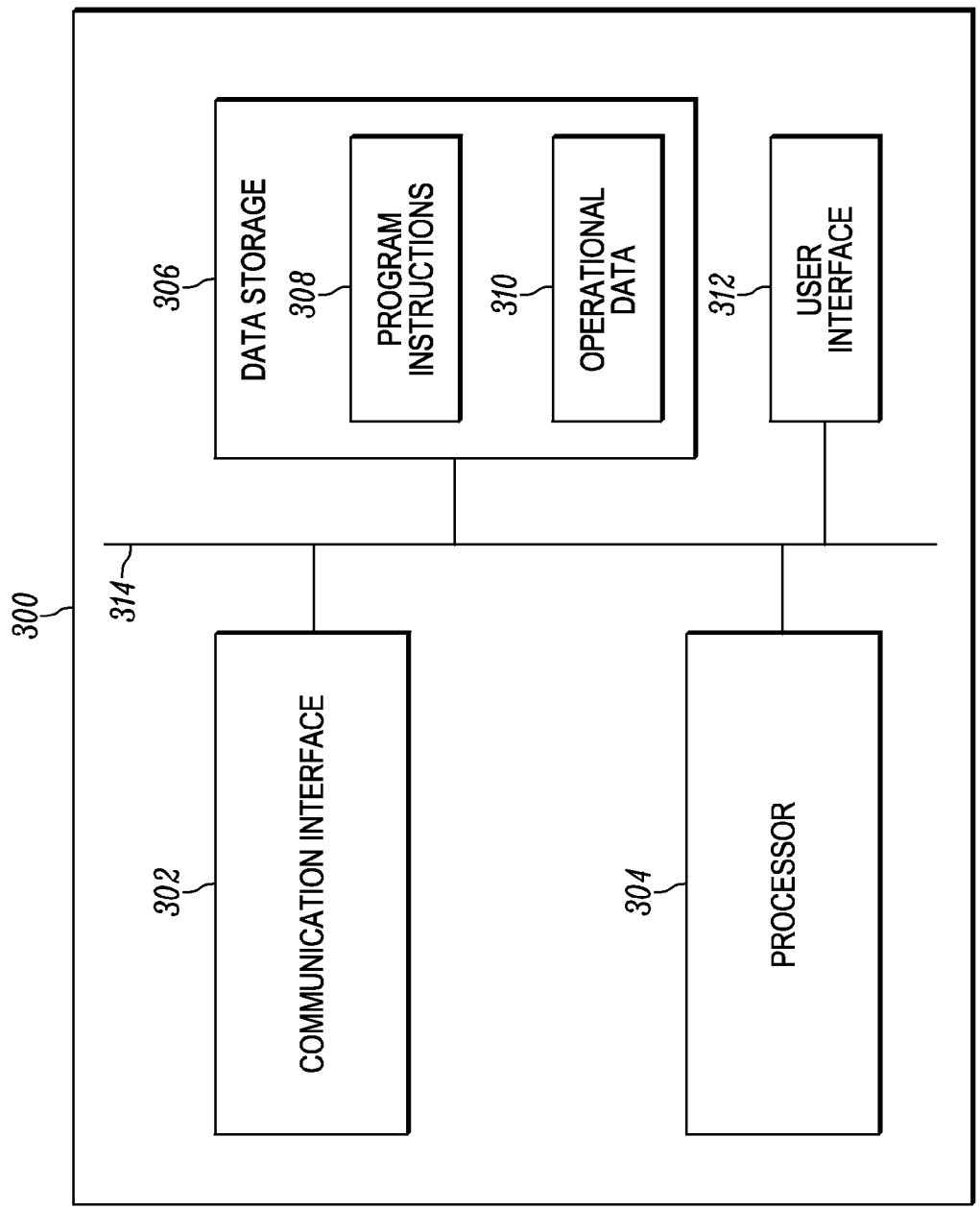
FIG. 3 depicts an example computing and communication device (CCD), in accordance with an embodiment.

FIG. 3 depicts an example computing and communication device (CCD), in accordance with an embodiment. At least one embodiment takes the form of a system that includes a communication interface, a processor, and data storage containing instructions executable by the processor for causing the system to carry out a set of functions. The set of functions includes using the mode controller to selectively place the wireless-communication device in a carrier-aggregation mode or in a fast-network-switching mode. The set of functions also includes, if the mode controller places the wireless-communication device in the carrier-aggregation mode, responsively disabling the fast-network-switching connection manager and enabling at least the first carrier-aggregation circuit to be operable to conduct carrier aggregation with respect to communications that are associated with a first network credential and that are conducted via at least the first RFIC. The set of functions also includes, if the mode controller places the wireless-communication device in the fast-network-switching mode, responsively enabling the fast-network-switching connection manager to be operable to conduct fast network switching with respect to (i) communications that are associated with the first network credential and that are conducted via the first RFIC and (ii) communications that are associated with a second network credential and that are conducted via the second RFIC. The set of functions also includes communicating via at least the first RFIC according to the selected mode.

The example CCD 300 is depicted as including a communication interface 302, a processor 304, a data storage 306, and an optional user interface 312, all of which are communicatively coupled with one another via a system bus (or other suitable connection, network, or the like) 314. As a general matter, the example CCD 300 is presented as an example system that could be programmed and configured to carry out the functions described herein. Additionally, an example WCD 110 may be embodied by the example CCD 300.

The communication interface 302 may include one or more wireless-communication interfaces (for communicating according to, e.g., LTE, Wi-Fi, Bluetooth, and/or one or more other wireless-communication protocols) and/or one or more wired-communication interfaces (for communicating according to, e.g., Ethernet, USB, and/or one or more other wired-communication protocols). As such, the communication interface 302 may include any necessary hardware (e.g., chipsets, antennas, Ethernet cards, etc.), any necessary firmware, and any necessary software for conducting one or more forms of communication with one or more other entities as described herein. The processor 304 may include one or more processors of any type deemed suitable by those of skill in the relevant art, some examples including a general-purpose microprocessor and a dedicated digital signal processor (DSP).

The data storage 306 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 3, the data storage 306 contains program instructions 308 executable by the processor 304 for carrying out various functions and operational data 310. In an embodiment in which a computing system such as the example CCD 300 is arranged, programmed, and configured to carry out processes such as the process 1300 described herein, the program instructions 308 are executable by the processor 304 for carrying out those functions; in instances where other entities described herein have a structure similar to that of the example CCD 300, the respective program instructions 308 for those respective devices are executable by their respective processors 304 to carry out functions respectively performed by those devices.

The optional user interface 312 may include one or more input devices (a.k.a. components and the like) and/or one or more output devices. With respect to input devices, the optional user interface 312 may include one or more touchscreens, buttons, switches, knobs, microphones, and the like. With respect to output devices, the optional user interface 312 may include one or more displays, speakers, light emitting diodes (LEDs), and the like. Moreover, one or more components (e.g., an interactive touchscreen-and-display component) of the optional user interface 312 could provide both user-input and user-output functionality. And certainly other user-interface components could be used in a given context, as known to those of skill in the art.

The following paragraphs describe various example WCDs. Each example WCD 400-1200 may be an embodiment of the example CCD 300 as described with reference to FIG. 3 above. Each example WCD 400-1200 may be an embodiment of an example WCD 110. Furthermore, although the various example WCDs are depicted and described as having explicit connections, couplings, interfaces, and the like, between various elements, modules, components, and the like, it is duly noted that the various WCD elements may be interconnected in a manner deemed suitable by those of skill in the relevant art, even in the absence of explicit inter-module connection and intra-module connection depictions and descriptions. Additionally, although the various example WCDs are depicted and described as having explicit elements, modules, components, and the like, it is duly noted that various non-depicted WCD elements may be included in a manner deemed suitable by those of skill in the relevant art, even in the absence of explicit depictions and descriptions.

As a general matter, roaming requires that an arrangement has been made between two carriers (i.e., service providers). Typically, certain network elements must be built out in order to enable roaming Each credential in a roaming device typically needs to include a list of roaming frequencies that are available. Moreover, roaming from one network to another can take up to 30 seconds. As a general observation, roaming is an approach that is often used when a relatively large carrier acquires a relatively small carrier, in order to gain access to the small carrier's spectral resources. Moreover, it is expected that, in the future, public-safety networks will establish roaming arrangements with more than one domestic service provider.

In at least one embodiment, switching among networks while operating according to a fast-network-switching mode includes fast-network switching among networks in a given set of networks. For example, if a mode controller selectively places a WCD in the fast-network-switching mode, and the WCD switches from using a first network to using a second network, that switch could constitute a fast network switch from the first network to the second network. The WCD may determine that such a switch is necessary for a variety of reasons. Some of these reasons include the WCD experiencing poor signal strength, a user selecting a preferred network, and many other possibilities that could be listed here.

As the term is used in this disclosure, a fast network switch involves a WCD switching from (i) communicating over a particular wireless band (i.e., RF front end) via one RFIC to (ii) communicating over a different wireless band (i.e., RF front end) via another RFIC. A dual-subscription WCD is able to establish the latter of those two connections (using the other RFIC and the different RF front end) while the former of those two connections (using the first RFIC and the particular RF front end) remains active. This enables the WCD to make its new connection before it breaks its old connection. And while the make-before-break variety of fast-network switching has certain advantages such as providing the ability to maintain session continuity, the term fast-network switching includes break-before-make varieties as well.

Figure 4:
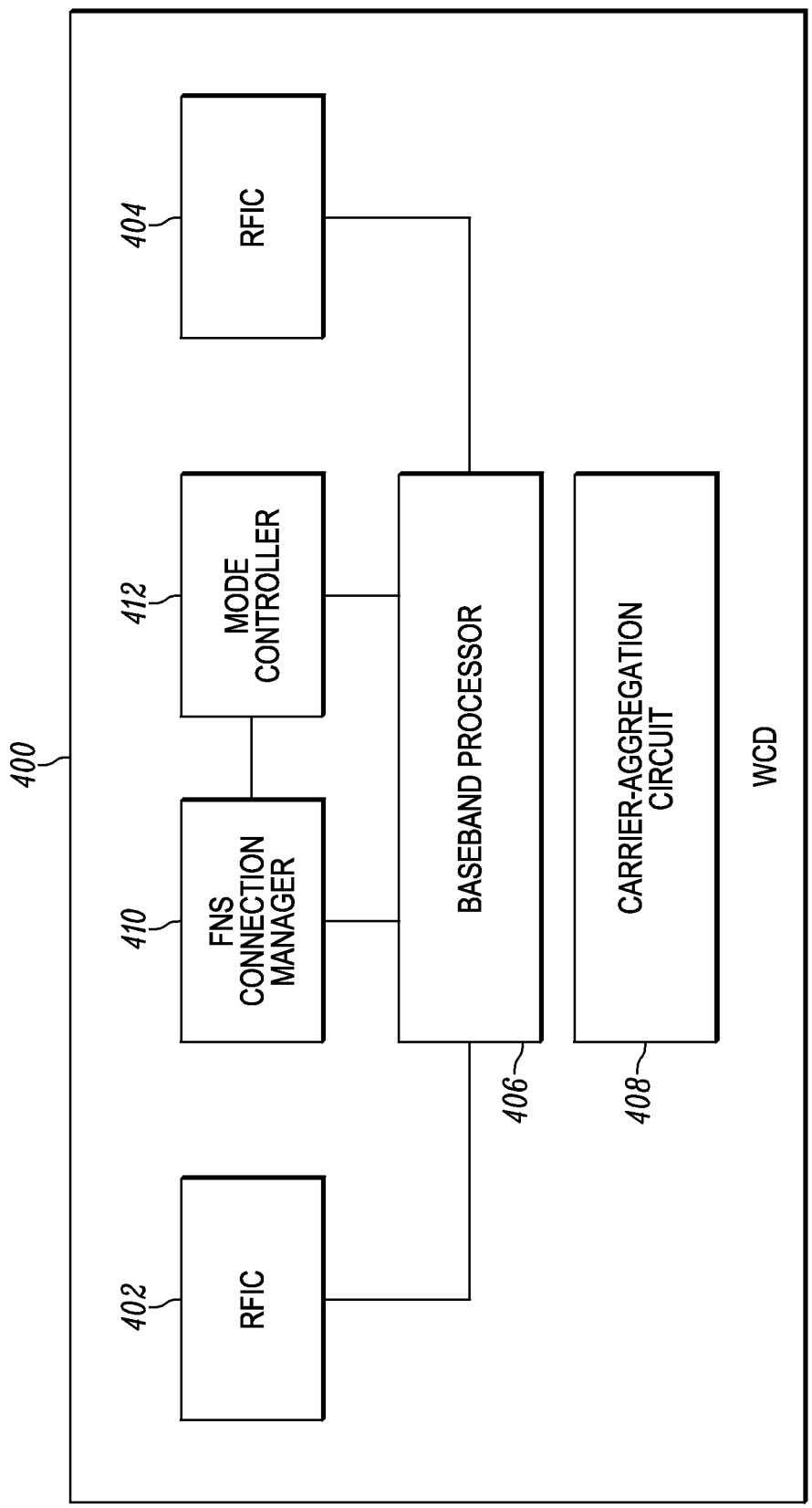
FIG. 4 depicts a first example wireless-communication device (WCD), in accordance with an embodiment.

FIG. 4 depicts a first example WCD, in accordance with an embodiment. In particular, FIG. 4 depicts a WCD 400 as including an RF integrated circuit (RFIC) 402, an RFIC 404, a baseband processor 406, a carrier-aggregation circuit 408, a fast-network-switching (FNS) connection manager 410, and a mode controller 412.

The baseband processor 406 is coupled to the RFIC 402 and to the RFIC 404. The FNS connection manager 410 is coupled to the baseband processor 406. The mode controller 412 is coupled to the baseband processor 406 and to the FNS connection manager 410.

In at least one embodiment, the mode controller 412 is configured to selectively place the WCD 400 in a carrier-aggregation mode or in a fast-network-switching mode. In the carrier-aggregation mode, the WCD 400 is operable to conduct carrier aggregation using at least the carrier-aggregation circuit 408 with respect to communications that are associated with a first network credential and that are conducted via at least the RFIC 402. In the fast-network-switching mode, the WCD 400 is operable to conduct fast network switching using the FNS manager 410 with respect to (i) communications that are associated with the first network credential and that are conducted via the RFIC 402 and (ii) communications that are associated with a second network credential and that are conducted via the RFIC 404.

In at least one embodiment, the baseband processor 406 comprises a Long Term Evolution-Advanced (LTE-A) processor.

In at least one embodiment, the mode controller 412 selectively places the WCD 400 in the carrier-aggregation mode or in the fast-network-switching mode based at least in part on a received indication. In at least one embodiment, the received indication comprises a selection of a home network for the WCD 400. In at least one embodiment, the WCD 400 receives the indication from a user interface, for example a user interface similar to the user interface 312 of the CCD 300 of FIG. 3. In at least one embodiment, the WCD 400 receives the indication from an infrastructure (e.g., a network infrastructure). In at least one embodiment, the WCD 400 receives the indication from a network (e.g., an incident area network).

As a general matter, the mode controller 412 selectively and possibly iteratively placing the WCD 400 in the carrier-aggregation mode or in the fast-network-switching mode can be carried out based on one or more of a wide variety of criteria. In at least one embodiment, the mode controller 412 selectively and possibly iteratively placing the WCD 400 in the carrier-aggregation mode or in the fast-network-switching mode takes as inputs (is carried out based at least in part on) one or more of: relative band coverage, relative signal strength of multiple networks, current in-incident or not-in-incident status, mission-critical data-throughput requirement for one or more applications, mission-critical data-throughput requirement for one or more public-safety applications, supported carrier-aggregation-band combinations, maintenance of session continuity; a time of day; a location of the WCD 400; a mobility pattern of the WCD 400; security credentials supported by each of the RFICs 402 and 404; the respective sets of RF front ends supported by each of the RFICs 402 and 404; applications supported by each of the RFICs 402 and 404; applications supported by one or more supported networks; a network load of one or more of the supported networks (at a site of a given incident and perhaps also at one or more sites of one or more neighboring incidents); a cost of operating on one or more of the supported networks; relative ratio of commercial-network coverage to public-safety-network coverage; and a selection of a network from among the supported networks as a home network for the WCD 400. These various example criteria are further discussed below. And it is further noted that, other than the last criterion in the previous list (i.e., the selection of a network from among the supported networks as a home network for the WCD 400), any one or more of the other criteria in the previous list could be used in various different embodiments to in fact select a given network as being the home network for the WCD 400.

In at least one embodiment, The FNS Connection manager may take as input, channel-monitoring measurements (e.g., reference signal received power (RSRP) and/or reference signal received quality (RSRQ). These measurements are taken by the RFICs 402-404 and/or the baseband processor 406. For some embodiments, the FNS connection manager may initiate/request these measurements. For other embodiments these measurements are received by the FNS periodically. The FNS Connection manager may carry out one or more hysteresis functions to stabilize mode switching behavior. The FNS Connection manager may send mode-switching and/or network-switching instructions to the mode controller 412 based on channel-monitoring values that the FNS Connection manager essentially continuously monitors. In at least one embodiment, one or both of the mode controller 412 and the FNS Connection manager are executed on (i.e., by) a host processor of a WCD. The FNS Connection manager may assist the mode controller 412 by providing instructions and/or other information regarding fast-network switches, roaming events, and the like.

The FNS Connection manager may carry out its functions at least in part by simultaneously monitoring the signal strengths of two different wireless bands by way of the two different RFICs 402 and 404 and/or the baseband processor 406 of the WCD 400. The FNS Connection manager may carry out additional functions such as validating signal thresholds. Moreover, in addition to assisting the mode controller 412 in making mode-switching determinations, the FNS Connection manager may indeed be controlled by the mode controller 412, in that the mode controller 412 may instruct the FNS Connection manager to, e.g., monitor particular pairs of signals using one or more RFICs depending on the current mode of the device. In at least one embodiment, the FNS Connection manager enables the WCD 400 to perform a fast-network switch in a time period on the order of three seconds or less, thus providing real opportunities for the maintaining of session continuity for mission-critical applications.

In at least one embodiment, the mode controller 412 selectively and possibly iteratively places the WCD 400 in the carrier-aggregation mode or in the fast-network-switching mode based at least in part on a dynamic mode-selection algorithm. In at least one such embodiment, the dynamic mode-selection algorithm takes as inputs (i.e., is carried out based at least in part on) one or more of: relative band coverage, relative signal strength of multiple networks, current in-incident or not-in-incident status, mission-critical data-throughput requirement for one or more applications, mission-critical data-throughput requirement for one or more public-safety applications, supported carrier-aggregation-band combinations, maintenance of session continuity; a time of day; a location of the WCD 400; a mobility pattern of the WCD 400; security credentials supported by the RFIC 402; security credentials supported by the RFIC 404; respective sets of wireless bands supported by each of the RFICs 402 and 404; respective applications supported by each of the RFICs 402 and 404; applications supported by one or more connected networks; a network load of one or more of the connected networks; a cost of operating on one or more of the connected networks; relative ratio of commercial-network coverage to public-safety-network coverage; and a selection of a network from among the connected networks as a home network for the WCD 400.

The dynamic-mode-selection algorithm may prioritize various inputs when instructing the mode controller 412 to selectively and possibly iteratively place the WCD 400 in the carrier-aggregation mode or in the fast-network-switching mode. Each input may be associated with a respective weighting factor, so that certain inputs play a more/less important role than others when being considered by the dynamic-mode-selection algorithm. It is possible that different sets of weighting factors may be employed based in part on the results of various inputs.

As mentioned above, in at least one embodiment, the dynamic-mode-selection algorithm takes as input relative band coverage and relative signal strength of multiple networks (at an incident). If a public safety LTE carrier has less coverage than commercial carrier, the carrier-aggregation mode might be used to leverage strong carrier coverage presence rather losing connectivity by doing a FNS to public safety LTE. The decision can be vice versa if public safety LTE has good coverage at incident.

As mentioned above, in at least one embodiment, the dynamic-mode-selection algorithm takes as input a current in-incident or not-in-incident status. While in an incident, usage of public safety LTE might be important in order to run public safety applications to their fullest extent and hence the FNS mode is preferred. While out of incident, there may be need to upload/download a large amount of content to/from a backend and hence the carrier-aggregation mode is preferred.

As mentioned above, in at least one embodiment, the dynamic-mode-selection algorithm takes as input one or both of a mission-critical data-throughput requirement for one or more public-safety applications and a mission-critical data-throughput requirement for one or more non-public-safety applications. A higher mission-critical data-throughput requirement is associated with a greater carrier-aggregation mode preference. In particular, for the mission-critical data-throughput requirement for one or more public-safety applications, desired carrier aggregation would be between a public safety LTE band and an augmented carrier-aggregation-capable commercial band (this may require spectrum leasing/sharing).

As mentioned above, in at least one embodiment, the dynamic-mode-selection algorithm takes as input supported carrier-aggregation-band combinations supported both by a WCD and a network. The WCD may be forced to choose a certain carrier-aggregation mode (between certain supported bands) or, the FNS mode (when both a device and a network side of carrier-aggregation-band support are not available).

As mentioned above, in at least one embodiment, the dynamic-mode-selection algorithm takes as input maintenance of session continuity. That is, the mode controller 412 selectively placing the WCD 400 in the fast-network-switching mode could be carried out so that session continuity can be maintained during a switch of networks according to the selected fast-network-switching mode. In some cases, a determination that maintaining session continuity is important is based at least in part on whether the WCD 400 is currently using or is about to use an application that has been deemed mission-critical.

Some examples of communication applications that may well be deemed mission-critical include voice over LTE (VoLTE), capturing of video using a personnel-mounted (e.g., officer-mounted) video camera, push-to-talk (PTT), tunneled PTT (a.k.a. backup PTT) (e.g., if a given WCD leaves land mobile radio (LMR) range, and then communicates via a pipe (e.g., an LTE pipe) over a broadband connection in order to continue mission-critical PTT communication), remote location tracking, and real-time location reporting (during, e.g., in-building operations), though certainly numerous other example applications could be listed that may be deemed mission-critical in a given context.

There are a number of implementation options for ways in which the WCD 400 and/or network infrastructure can identify that a given application has been deemed mission-critical, such that maintenance of session continuity should be a priority, such that selection of, for example, the fast-network switching mode would be preferable to selecting the carrier-aggregation mode. In some instances, a public-safety agency or other agency or organization may define a given set of communication applications as being mission-critical communication applications, and may populate this information as appropriate across network-infrastructure elements and to WCDs (e.g., the WCD 400) as well. In some instances, applications deemed mission-critical may be systematically associated with relatively higher Quality of Service (QoS) Class Identifier (QCI) values as opposed to the QCI values with which non-mission-critical communication applications are systematically associated. And certainly other possible implementations could be listed here as well.

In instances in which continuity of a given session is to be maintained, this could be accomplished in a number of different ways. One option is to maintain session continuity using a technology known in the art as mobile virtual private network (MVPN). Moreover, in addition to maintaining session continuity using an approach such as MVPN, a given network entity can also buffer session data during the time it takes to complete a network-switching operation such as a fast-network switch as that term is used herein. Often this amount of time will be on the order of approximately three seconds or less. Any buffered data could then be made available to a given user as soon as the fast-network switch is complete, or perhaps the fast-network-switch completion would be followed by a reconnection to a real-time data stream, in which case the buffered data could be made available for later playout to a given user. In some cases, an MVPN tunnel that is used before and after a fast-network switch can help by buffering some content at the WCD 400 itself while the WCD 400 is still connected to a pre-fast-network-switch network, taking advantage of the make-before-break nature of many fast-network-switch operations. And certainly many other example implementations could be listed.

As mentioned above, in at least one embodiment, the dynamic-mode-selection algorithm takes as input the time of day. That is, a given mode could be programmatically selected during some times of the day, and another mode could be selected for other times of the day. And certainly numerous time periods could be delineated on different days, perhaps distinguishing weekdays from weekend days, and the like.

As mentioned above, in at least one embodiment, the dynamic-mode-selection algorithm takes as input the location of the WCD 400. That is, a given mode could be programmatically selected at a first set of one or more locations, and another mode could be programmatically selected at a second set of one or more locations. In various different embodiments, current location can be identified using factors such as longitude and latitude, GPS data, triangulation data, cell-site-location data, and the like.

As mentioned above, in at least one embodiment, the dynamic-mode-selection algorithm takes as input the mobility pattern of the WCD. That is, a given mode could be selected when the WCD 400 is on its home network, and a different mode could be selected when the WCD 400 is not on its home network. This may be useful in situations where the WCD 400 is associated with a user that frequently travels and is therefore frequently on a network other than its home network. In another example, a given public-safety officer may be assigned to work in a geographical region that is at or near the edge of two different networks; in such a case, it may be preferred that the WCD 400 operate in the fast-network-switching mode as opposed to the carrier-aggregation mode, for at least the reason that transitions between networks generally take less time as fast-network switches, and such a difference would only be amplified in a context in which numerous such network transitions would be likely to occur.

It is also separately noted that signal quality of a given network on which service is provided in a work-assignment area of a given public-safety officer may be such that the WCD 400 of that given public-safety officer would be better served homing on the given network while working such an assignment. And certainly numerous other examples could be listed as well regarding manners in which respective mobility patterns of WCDs could be used for mode selection (i.e., be taken as input by the dynamic-mode-selection algorithm) and/or current-home-network selection. As stated above, other than the criterion regarding which network is a given WCD's home network, any of the other criteria listed in this section of this disclosure could be used for mode selection and/or for current-home-network selection.

As mentioned above, in at least one embodiment, the dynamic-mode-selection algorithm takes as input the respective security (i.e., network) credentials supported by each of the RFICs 402 and 404. Indeed, it may be the case that multiple service providers agree to authenticate various WCDs based on the same SIM card or other credential (perhaps in a situation where multiple different service providers provide LTE service on various different bands in a given geographical area). Such a situation may influence mode selection (i.e., be taken as input by the dynamic-mode-selection algorithm), perhaps to increase the likelihood in a given scenario that the WCD 400 will make any necessary or desired network-to-network transitions on the same SIM card. And certainly other examples could be listed.

As mentioned above, in at least one embodiment, the dynamic-mode-selection algorithm takes as input respective sets of wireless bands (including support of carrier aggregation capable band combinations) supported by each of and between the RFICs 402 and 404. Similar to the description in the previous paragraph, it may be the case that the respective sets of wireless bands that are supported by each of the RFICs 402 and 404 influence mode selection (i.e., are taken as input by the dynamic-mode-selection algorithm), perhaps to increase the likelihood that the WCD 400 will make any necessary or desired network-to-network (or band-to-band) transitions on the same RFIC or, between the RFICs. The RF front-end design support and the extent of supported carrier-aggregation-band combinations will help in mode-selection between FNS and carrier-aggregation mode as well. And certainly other examples could be listed.

As mentioned above, in at least one embodiment, the dynamic-mode-selection algorithm takes as input the respective sets of applications supported by each of the RFICs 402 and 404. It may be the case that some applications may be usable in connection with specific network bands associated with some RFICs but not others (e.g., with the RFIC 402 but the not RFIC 404). It may be the case that some applications may work better (e.g., operate faster, provide one or more enhanced features, etc.) in connection with specific network bands associated with some RFICs than with others (e.g, certain mission critical applications being allowed with certain QoS priority over public safety network than the same application either not allowed or, allowed with limited capability in commercial carrier network). And certainly other examples could be listed.

As mentioned above, in at least one embodiment, the dynamic-mode-selection algorithm takes as input the respective sets of applications supported by one or more of the supported networks. This example is somewhat similar to that of the previous paragraph, in that various different RFICs will typically be compatible with various different networks, and some communication applications may be supported on some networks and not on others, and some communication applications may work better (e.g., operate faster, have shorter characteristic restart times, provide one or more enhanced features, etc.) in connection with some networks than with others. Thus, the desirability of operating in the fast-network-switching mode—as opposed to in the carrier-aggregation mode—may be amplified in the context of communication applications that tend to require a relatively substantial amount of time to restart, as maintenance of session continuity by operation of fast-network-switching operations can preclude the need to restart. And certainly other examples could be listed as well.

On the topic of home-network selection, it may be the case that a given public-safety agency prefers or even requires that certain applications be run or executed at a given incident scene, and it may further be the case that such applications perform better on one network (e.g., a public-safety-specific LTE network) than on another network (e.g., a commercial LTE network); in such a scenario, it may be advantageous for a given public-safety WCD to operate with the former as its home network as opposed to the latter. And certainly other examples could be listed as well.

As mentioned above, in at least one embodiment, the dynamic-mode-selection algorithm takes as input the respective network loads of one or more of the supported networks (e.g., at a site of a given incident and perhaps also at one or more sites of one or more neighboring incidents). In one example, a public-safety agency or other organization may select the fast-network-switching mode as opposed to the carrier-aggregation mode to facilitate the WCD 400 switching networks quickly and with session continuity as loads on various networks dynamically change over time during the duration of a given incident. And on the topic of home-network selection, when the respective device credentials of a given set of WCDs provide multiple home-network options, a given agency can load balance across networks by way of selecting different home networks for different devices, causing the devices to distribute themselves across various networks per their respective home-network designations. And certainly other examples could be listed as well.

As mentioned above, in at least one embodiment, the dynamic-mode-selection algorithm takes as input the respective and relative costs of the WCD 400 operating on one or more of the supported networks. Thus, depending on the various costs of operating on various networks as a homed SIM, operating on various networks using various different SIMs, operating on various networks using various different RFICs, roaming on various networks, and/or the like, computations can be made to estimate, predict, and/or the like the various costs associated with operating in a given set of circumstances in one mode vs. another; accordingly, a mode that is associated with a lower relative cost can be selected; and some situations may arise where one or more other advantages of operating on one network vs. another (e.g., signal quality, feature set, and/or the like) may outweigh a given cost savings and counsel towards selecting a relatively more expensive operating mode. And certainly numerous other examples could be listed as well.

As mentioned above, in at least one embodiment, the dynamic-mode-selection algorithm takes as input the relative ratio of commercial-network coverage to public-safety-network coverage (or vice versa) (e.g., at a given location). Indeed, it may be the case that, depending on the degrees of commercial coverage and public-safety coverage that are present at the location of a given public-safety incident, public-safety work assignment, or the like, an associated public-safety agency may select a given group (i.e., pool) of WCDs to be dispatched to and used at the given location, and may further configure (e.g., by over-the-air instructions) those WCDs to operate in certain modes and/or to operate with certain networks as their home networks. And certainly it is the case that different WCDs that are configured for operation at a given incident scene or the like can be configured to operate in different ways at that scene (e.g., in different modes and/or homed on different networks). Moreover, one or more such WCDs could be configured such that a user, incident-scene commander, and/or the like is able to change mode selections and/or home-network selections dynamically at the scene of an incident. And certainly numerous other implementation examples could be listed here as well.

In at least one embodiment, the WCD 400 further comprises a network-credential module providing both the first network credential and the second network credential. In at least one such embodiment, the network-credential module comprises a subscriber identity module (SIM).

In at least one embodiment, being operable to conduct carrier aggregation comprises the WCD 400 being operable to conduct carrier aggregation between a first commercial band and a second commercial band. In at least one embodiment, being operable to conduct carrier aggregation comprises the WCD 400 being operable to conduct carrier aggregation between a commercial band and a public-safety band.

In at least one embodiment, being operable to conduct fast network switching comprises the WCD 400 being operable to conduct fast network switching between a first commercial band and a second commercial band. In at least one embodiment, being operable to conduct fast network switching comprises the WCD 400 being operable to conduct fast network switching between a commercial band and a public-safety band. In at least one embodiment, being operable to conduct fast network switching comprises the WCD 400 being operable to use a mobile-virtual-private-network (MVPN) connection to maintain session continuity during a fast-network-switching operation.

In at least one embodiment, the WCD 400 is homed on a public-safety band and has roaming access to a commercial band. In at least one embodiment, the WCD 400 is homed on a commercial band and has roaming access to a public-safety band.

Figure 5:
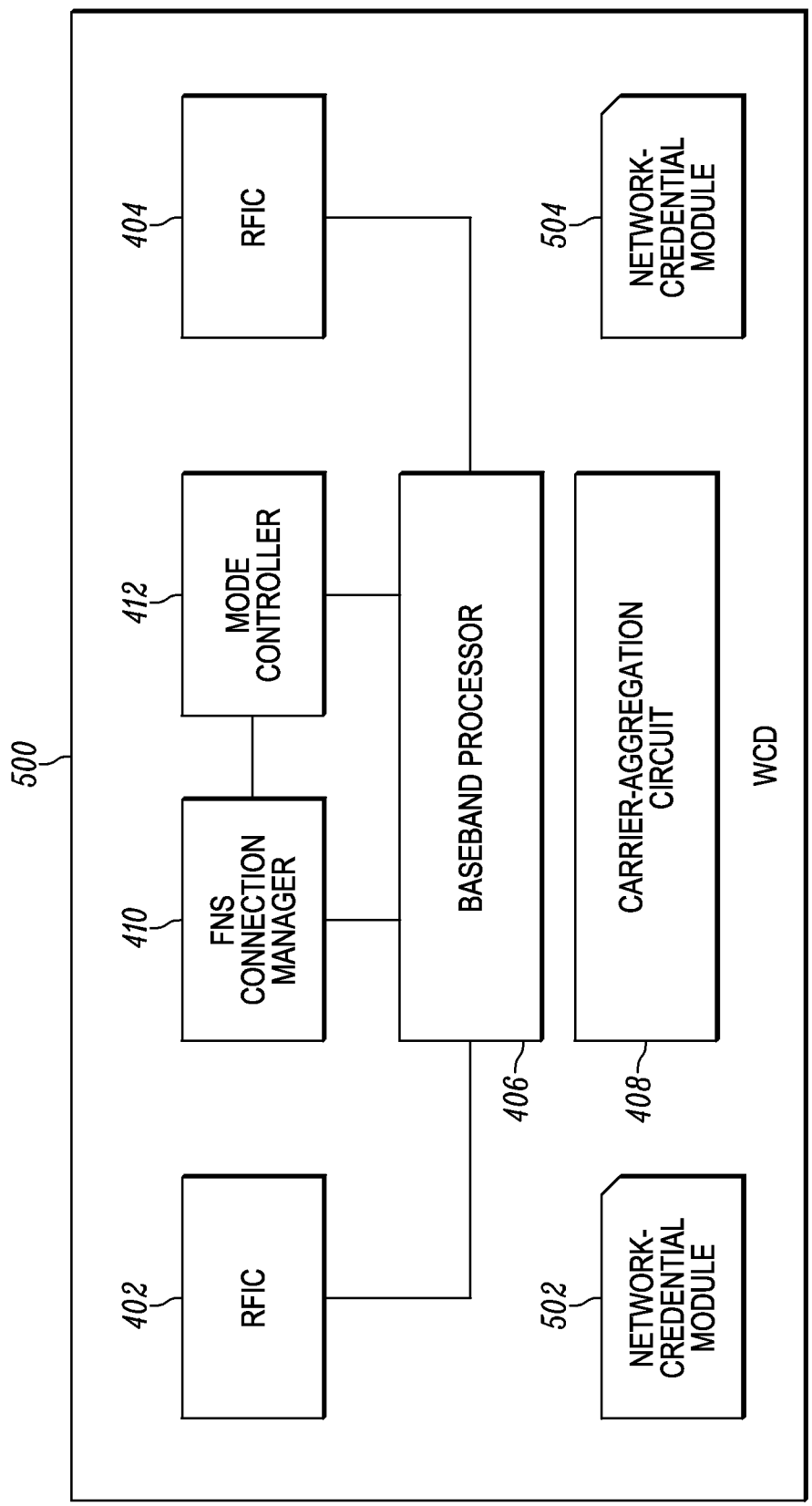
FIG. 5 depicts a second example WCD, in accordance with an embodiment.

FIG. 5 depicts a second example WCD, in accordance with an embodiment. In particular, FIG. 5 depicts a WCD 500 as a further example of the WCD 400 of FIG. 4. In addition to the elements described with respect to the WCD 400 of FIG. 4, the WCD 500 further includes a network-credential module 502 providing the first network credential and a network-credential module 504 providing the second network credential. In at least one embodiment, the network-credential module 502 comprises a first subscriber identity module (SIM) and the network-credential module 504 comprises a second SIM.

Moreover, at least one embodiment is configured for a scenario in which a WCD such as the WCD 500 contains a particular-network credential module (e.g., SIM) that is shared by multiple service providers. That is, it can occur that a single SIM includes respective different network credentials for respective different networks operated by different service providers (i.e., carrier networks). Furthermore, each physical card may contain one or more USIM, ISIM, and/or CSIM applications, as examples. In at least one embodiment, the network-credential module 502 and the network-credential module 504 each include one or more USIM, ISIM, and/or CSIM applications. Thus, using FIG. 5 as an illustrative example, either or both of the network-credential module 502 and the network-credential module 504 could contain multiple network credentials that are respectively associated with multiple different networks.

Each SIM card may take the form of a full-size SIM, mini-SIM, micro-SIM, or nano-SIM (i.e., a 1FF, 2FF, 3FF or 4FF card), among other possibilities known to those of skill in the relevant art. Each SIM may be embedded or removable depending, among other factors, on the forms of the network-credential module 502 and the network-credential module 504.

Those of skill in the relevant art will understand that relatively large frequency bands can be delineated into multiple sub-bands, and that different sub-bands may be supported by different service-provider (i.e., carrier) networks in different geographic areas. As one example, an LTE band known as band 14 (B14) could be sub-divided in a particular city into two sub-bands that are each 5×5 MHz-FDD (frequency division duplex) sub-bands or, a large LTE band known as band 28 (B28) with 45+45 MHz frequency spectrum could be sub-divided in a particular city into multiple sub-bands. In such an example, multiple different service providers and/or agencies could provide service and credentials on those multiple different example sub-bands. And certainly numerous other such examples could be listed. In general, the collection of bands (perhaps including one or more sub-bands) on which a given service provider issues credentials and correspondingly provides service could be contiguous or non-contiguous spectral resources.

In at least one embodiment, the bands supported by the RFICs 402 and 404 of the WCD 500 are all LTE bands on which LTE service is provided by multiple different carriers in contiguous and/or non-contiguous sections of the electromagnetic spectrum. In at least one such embodiment, either the network-credential module 502 or the network-credential module 504 is a commercial SIM, and the other network-credential module is a public-safety SIM. The WCD 500 can be homed on a commercial LTE band or on a public-safety LTE band. The WCD 500 can be homed using either SIM, and either SIM can contain one network credential for one network or rather can contain multiple different network credentials for multiple different respective networks. And certainly numerous other possibilities could be listed here, given the flexible nature of the presently disclosed methods and apparatus.

Figure 6:
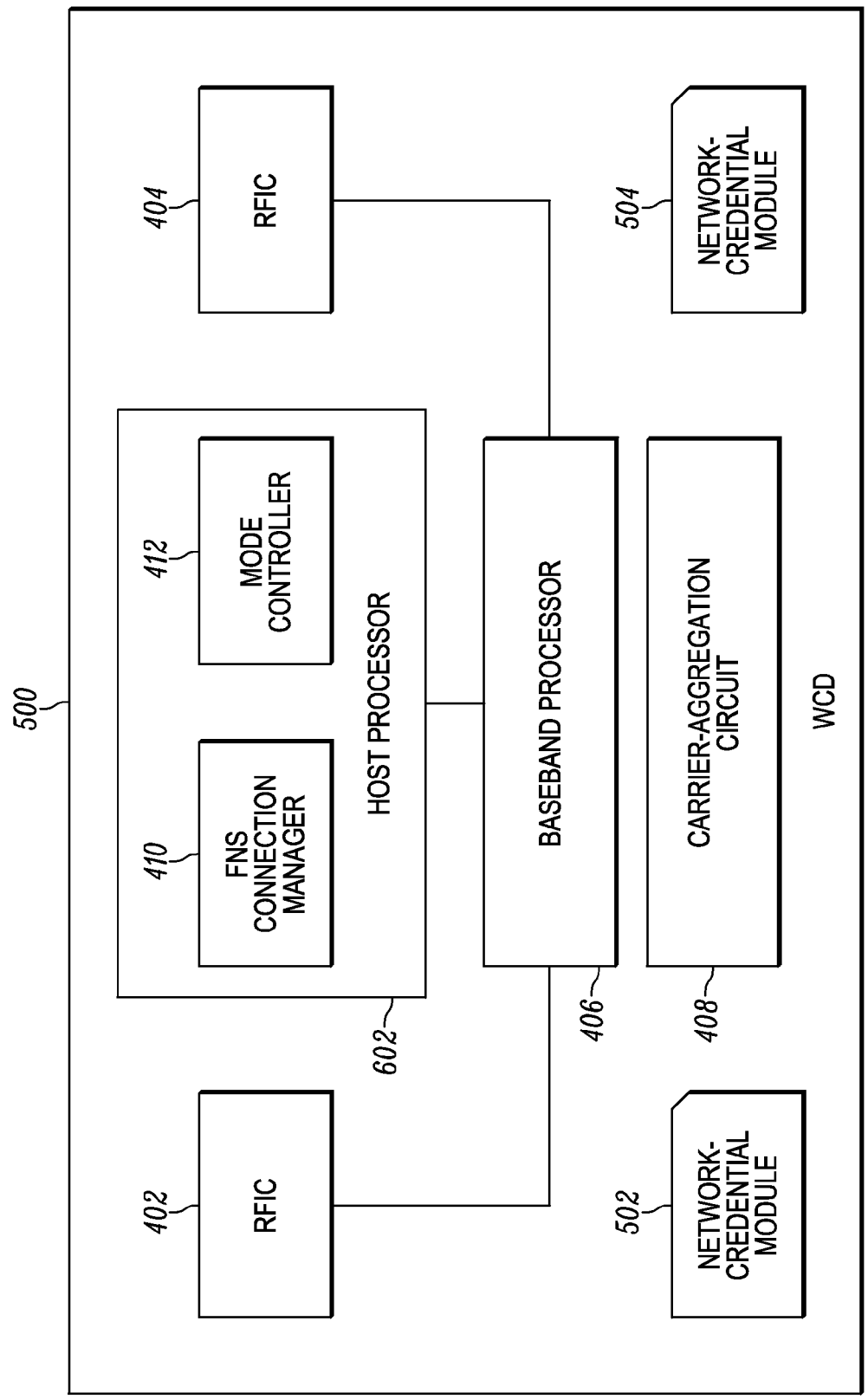
FIG. 6 depicts a third example WCD, in accordance with an embodiment.

FIG. 6 depicts a third example WCD, in accordance with an embodiment. In particular, FIG. 6 depicts a WCD 600 as a further example of the WCD 500 of FIG. 5. In addition to the elements described with respect to the WCD 500 of FIG. 5, the WCD 600 further includes a host processor 602 coupled to the baseband processor 406. In at least one embodiment, the host processor 602 comprises the FNS connection manager 414 and the mode controller 416.

Figure 7:
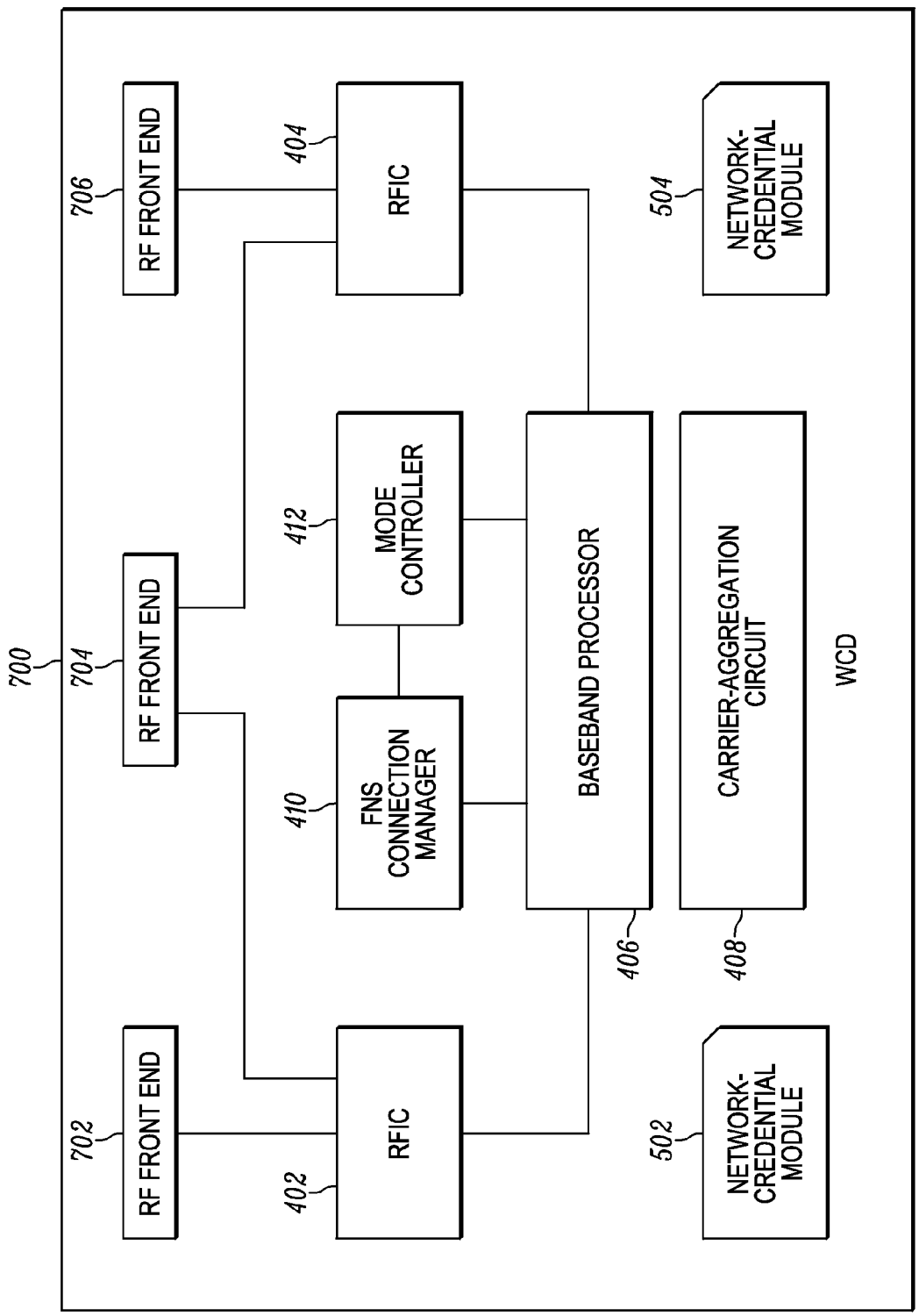
FIG. 7 depicts a fourth example WCD, in accordance with an embodiment.

FIG. 7 depicts a fourth example WCD, in accordance with an embodiment. In particular, FIG. 7 depicts a WCD 700 as a further example of the WCD 500 of FIG. 5. In addition to the elements described with respect to the WCD 500 of FIG. 5, the WCD 700 further includes a plurality of RF front ends, RF front end 702, RF front end 704, and RF front end 706, that are each configured for communication via a respective band and coupled to one or both of the RFICs 402 and 404. In FIG. 7 the RF front end 702 is coupled to the RFIC 402. In FIG. 7 the RF front end 704 is coupled to both the RFIC 402 and the RFIC 404. In FIG. 7 the RF front end 706 is coupled to the RFIC 404. The depiction of the WCD 700 as having three RF front ends, the RF front ends 702-706, is purely for the sake of visual simplicity, and indeed more or less than three RF front ends can be included in various other embodiments. Those skilled in the art will recognize that the various RF front-ends 702-706 may include some band-specific components such as filters and amplifiers, and some broadband components.

Figure 8:
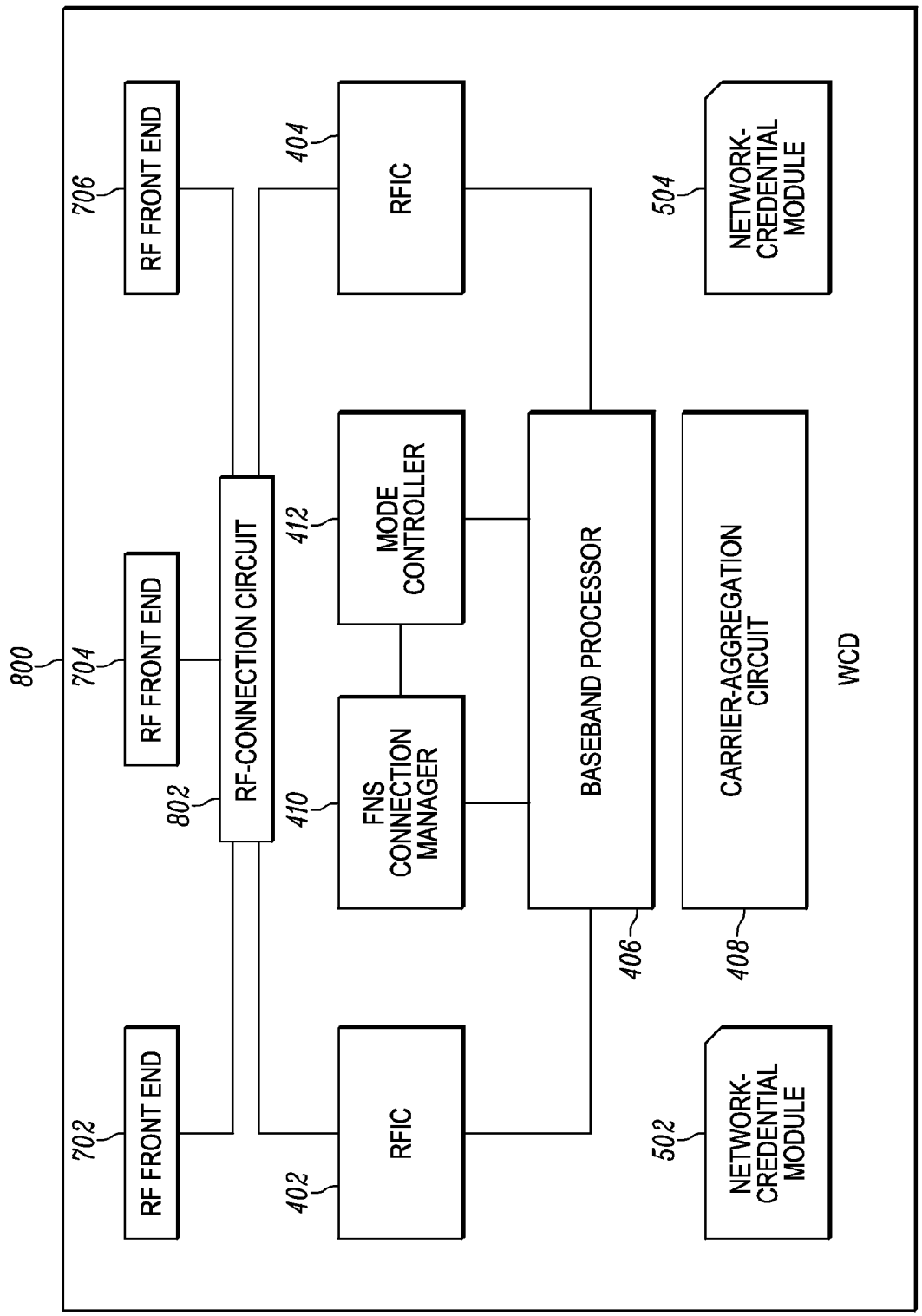
FIG. 8 depicts a fifth example WCD, in accordance with an embodiment.

FIG. 8 depicts a fifth example WCD, in accordance with an embodiment. In particular, FIG. 8 depicts a WCD 800 as a further example of the WCD 700 of FIG. 7. In addition to the elements described with respect to the WCD 700 of FIG. 7, the WCD 800 further includes an RF-connection circuit 802. The plurality of RF front ends, RF front end 702, RF front end 704, and RF front end 706, are each coupled to one or both of the first and second RFICs via the RF-connection circuit 802.

Figure 9:
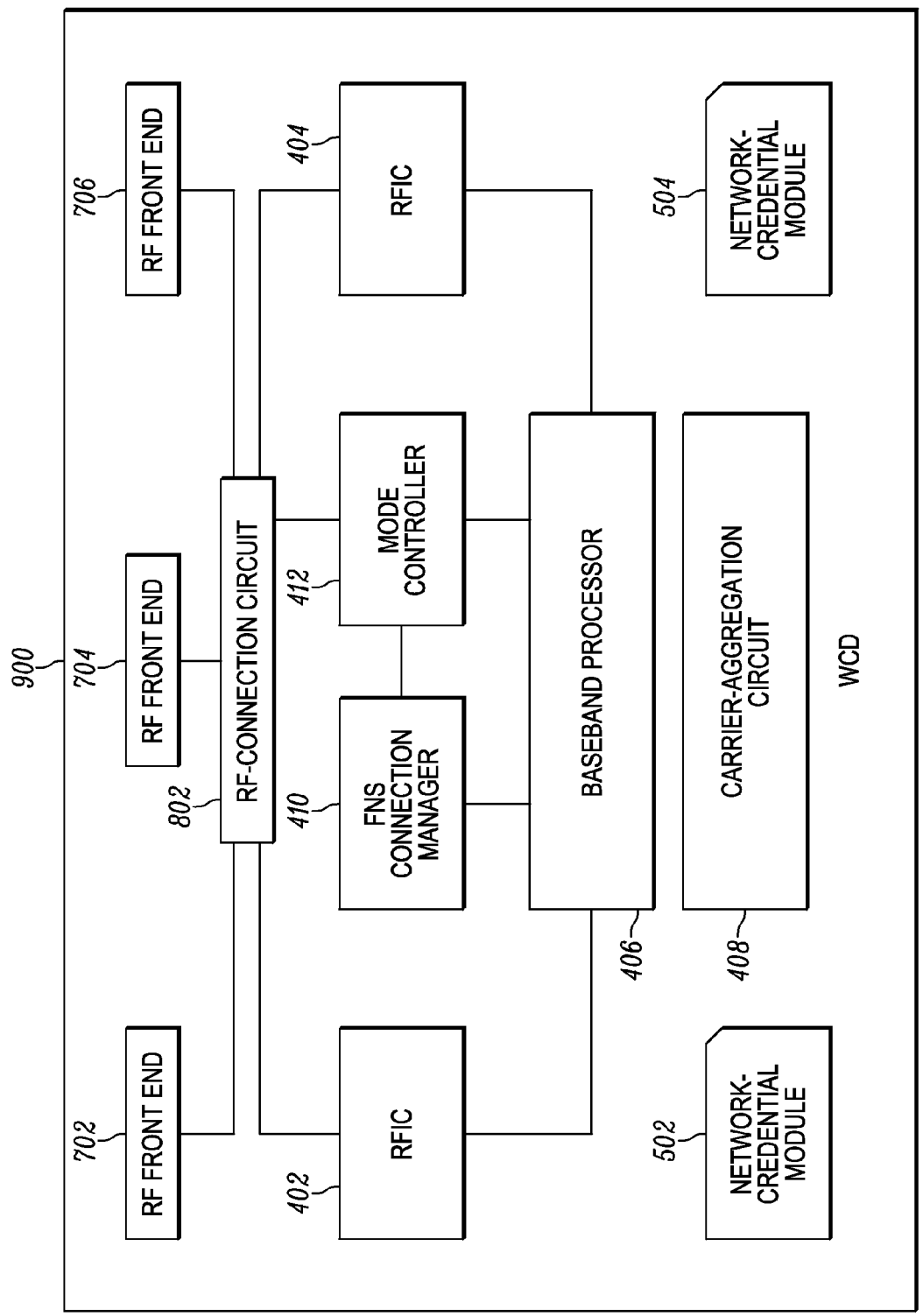
FIG. 9 depicts a sixth example WCD, in accordance with an embodiment.

FIG. 9 depicts a sixth example WCD, in accordance with an embodiment. In particular, FIG. 9 depicts a WCD 900 as a further example of the WCD 800 of FIG. 8. In addition to the elements described with respect to the WCD 800 of FIG. 8, the WCD 900 further includes the mode controller 412 being coupled to the RF-connection circuit 802. In at least one embodiment, each RF front end 702-706 in a first set of the RF front ends is coupled to both the RFIC 402 and to the RFIC 404 via the RF-connection circuit 802, and at any given time, each RF front end 702-706 in the first set of RF front ends has an active connection via the RF-connection circuit 802 to one or more of the RFICs 402-404. Each carrier-aggregation-enabled RFIC can have one or more RF input ports from the RF-connection circuit 802. The RF connection circuit 802 may route two signals to RFIC 402. These two signals could be in one large band that has been split into sub-bands. In this case only one RF front end is used. Alternatively, the two carrier-aggregated signals could be from two different bands, in which case two RF front ends delivering signals to RFIC 402 are used. In FIG. 9 the mode controller 412 is further configured to selectively control whether each respective RF front end 702-706, in the first set of RF front ends has an active connection at a particular time to the RFIC 402 or instead to the RFIC 404. In FIG. 9, by way of example, each respective RF front end 702-706 is in the first set of RF front ends. In another embodiment, not every RF front end (e.g., RF front ends 702-706) is in the first set of RF front ends.

The RF-connection circuit 802 may include one or more physical RF switches. In at least one embodiment, the RFICs 402 and 404 share at least one common antenna (i.e., RF front end). The RF-connection circuit 802 may contain hardware for converting a radio frequency signal into a baseband signal. The RF-connection circuit 802 may contain hardware for converting a baseband signal into a radio frequency signal. In at least one embodiment, a mode indicator is sent from the mode controller 412 to the RF-connection circuit 802. The mode indicator conveys whether the WCD 900 is in the fast-network-switching mode or in the carrier-aggregation mode. In such an embodiment, the RF-connection circuit 802 routes data based at least in part on the mode indicator.

The RF-connection circuit 802 may be an independent integrated circuit, may be combined with some other processing unit (e.g., the baseband processor 406), or may be distributed amongst a plurality of other modules (e.g., the RF front ends 702-706). In at least one embodiment, the mode controller 412 is software, implemented as a set of instructions executable by a processor for causing the RF-connection circuit 802 to carry out a set of functions. The set of functions may include routing signals based at least in part on the selected mode.

Figure 10:
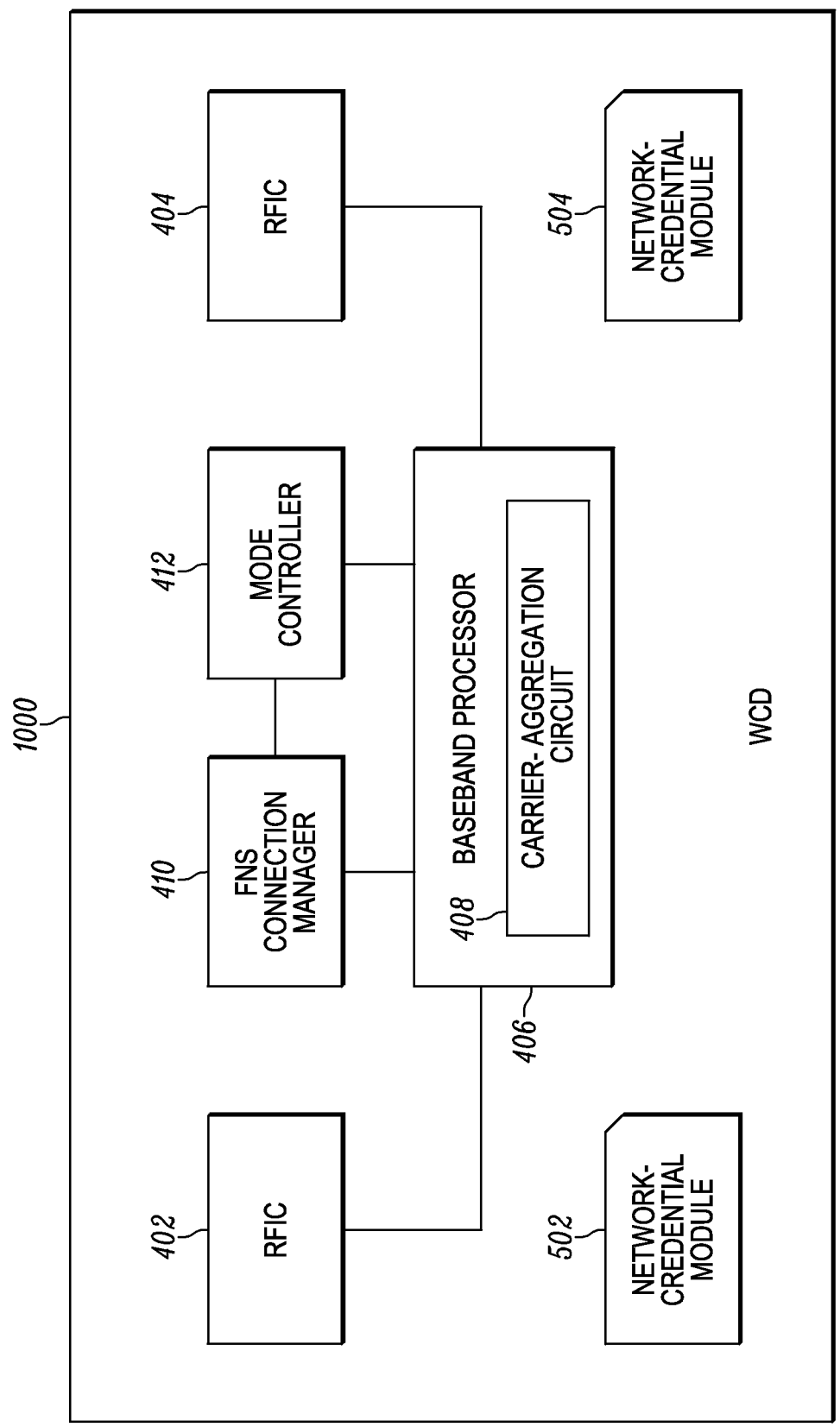
FIG. 10 depicts a seventh example WCD, in accordance with an embodiment.

FIG. 10 depicts a seventh example WCD, in accordance with an embodiment. In particular, FIG. 10 depicts a WCD 1000 as a further example of the WCD 500 of FIG. 5. In addition to the elements described with respect to the WCD 500 of FIG. 5, the WCD 1000 further includes the baseband processor 406 comprising the carrier-aggregation circuit 408, and in the carrier-aggregation mode, the WCD 1000 is operable to conduct carrier aggregation using the carrier-aggregation circuit 408 with respect to (i) communications that are associated with the first network credential and that are conducted via the RFIC 402 and (ii) communications that are associated with the first network credential and that are conducted via the RFIC 404.

Figure 11:
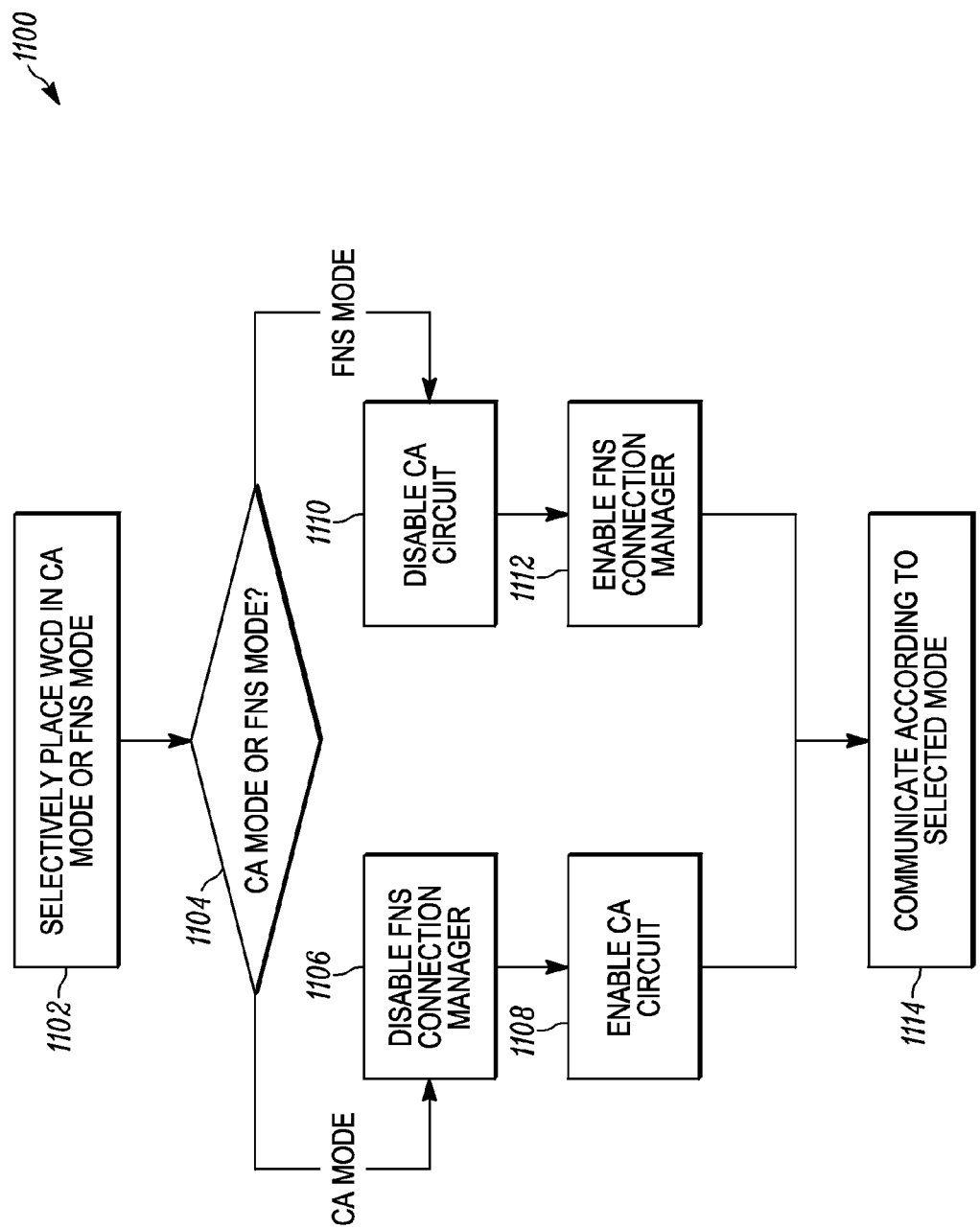
FIG. 11 depicts an example process, in accordance with an embodiment.

FIG. 11 depicts an example process, in accordance with an embodiment. In particular FIG. 11 depicts a process 1100 that includes steps 1102, 1104, 1106, 1108, 1110, 1112, and 1114. Although primarily depicted and described as being performed serially, at least a portion of the steps of the process 1100 may be performed contemporaneously, or in a different order than depicted and described with respect to FIG. 11. Additionally, the process 1100 may be repeated an arbitrary number of times. These steps are described below.

In at least one embodiment, the process 1100 is carried out by a mobile radio such as an example WCD 110, the example CCD of FIG. 3, and any of the example WCDs 400, 500, 600, 700, 800, 900, and 1000. In general, the process 1100 could be carried out by any radio (e.g., by any mobile radio, portable radio, vehicular subscriber modem and/or other radio) having a receiver and being otherwise suitably equipped, programmed, and configured to carry out the process 1100 (and/or one or more of the many variants of the process 1100 discussed herein).

Step 1102 includes using a mode controller to selectively place the WCD in a carrier-aggregation mode or in a fast-network-switching mode.

Step 1104 includes determining whether the WCD is in the carrier-aggregation mode or in the fast-network-switching mode.

Steps 1106 and 1108 are carried out in response to determining that the WCD is in the carrier-aggregation mode at step 1104.

Step 1106 includes disabling the fast-network-switching connection manager.

Step 1108 includes enabling at least the first carrier-aggregation circuit.

The combination of steps 1106 and 1108 support the WCD being operable to conduct carrier aggregation with respect to communications that are associated with a first network credential and that are conducted via at least the first RFIC.

Steps 1110 and 1112 are carried out in response to determining that the WCD is in the fast-network-switching mode at step 1104.

Step 1110 includes disabling at least the first carrier-aggregation circuit.

Step 1112 includes enabling the fast-network-switching connection manager.

The combination of steps 1110 and 1112 support the WCD being operable to conduct fast network switching with respect to (i) communications that are associated with the first network credential and that are conducted via the first RFIC and (ii) communications that are associated with a second network credential and that are conducted via the second RFIC.

In at least one embodiment, step 1110 is not carried out in response to determining that the WCD is in the fast-network-switching mode at step 1104. In such an embodiment, step 1112 is carried out in response to determining that the WCD is in the fast-network-switching mode at step 1104 and the process 1100 then proceeds to step 1114 without carrying out step 1110.

Step 1114 includes communicating via at least the first RFIC according to the selected mode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A wireless-communication device comprising:
   a first RF integrated circuit (RFIC) and a second RFIC;
   a baseband processor coupled to the first RFIC and to the second RFIC;
   a first carrier-aggregation circuit;
   a fast-network-switching connection manager coupled to the baseband processor; and
   a mode controller coupled to the baseband processor and to the fast-network-switching connection manager and configured to selectively place the wireless-communication device in a carrier-aggregation mode or in a fast-network-switching mode, wherein:
   in the carrier-aggregation mode, the wireless-communication device is operable to conduct carrier aggregation using at least the first carrier-aggregation circuit with respect to communications that are associated with a first network credential and that are conducted via at least the first RFIC, and
   in the fast-network-switching mode, the wireless-communication device is operable to conduct fast network switching using the fast-network-switching manager with respect to (i) communications that are associated with the first network credential and that are conducted via the first RFIC and (ii) communications that are associated with a second network credential and that are conducted via the second RFIC.

2. The wireless-communication device of claim 1, wherein the baseband processor comprises a Long Term Evolution-Advanced (LTE-A) processor.

3. The wireless-communication device of claim 1, further comprising a host processor coupled to the baseband processor, wherein the host processor comprises the fast-network-switching connection manager and the mode controller.

4. The wireless-communication device of claim 1, further comprising a plurality of RF front ends that are each configured for communication via a respective band and coupled to one or both of the first and second RFICs.

5. The wireless-communication device of claim 4, further comprising an RF-connection circuit, wherein the RF front ends in the plurality of RF front ends are each coupled to one or both of the first and second RFICs via the RF-connection circuit.

6. The wireless-communication device of claim 5, wherein:
   each RF front end in a first set of the RF front ends is coupled to both the first and second RFICs via the RF-connection circuit, and wherein, at any given time, each RF front end in the first set of RF front ends has an active connection via the RF-connection circuit to one but not both of the first and second RFICs; and the mode controller is coupled to the RF-connection circuit and is further configured to selectively control whether each respective RF front end in the first set of RF front ends has an active connection at a particular time to the first RFIC or instead to the second RFIC.

7. The wireless-communication device of claim 1, wherein the mode controller selectively places the wireless-communication device in the carrier-aggregation mode or in the fast-network-switching mode based at least in part on a received indication.

8. The wireless-communication device of claim 7, wherein the received indication comprises a selection of a home network for the wireless-communication device.

9. The wireless-communication device of claim 7, wherein the wireless-communication device receives the indication from a user interface.

10. The wireless-communication device of claim 7, wherein the wireless-communication device receives the indication from an infrastructure.

11. The wireless-communication device of claim 1, wherein the mode controller iteratively places the wireless-communication device in the carrier-aggregation mode or in the fast-network-switching mode based at least in part on a dynamic mode-selection algorithm.

12. The wireless-communication device of claim 11, wherein the dynamic mode-selection algorithm takes as inputs one or more of: relative band coverage, relative signal strength of multiple networks, current in-incident or not-in-incident status, mission-critical data-throughput requirement for one or more applications, mission-critical data-throughput requirement for one or more public-safety applications, maintenance of session continuity; a time of day; a location of the wireless-communication device; a mobility pattern of the wireless-communication device; respective security credentials supported by each of the first and second RFICs; respective sets of wireless bands supported by each of the first and second RFICs; respective applications supported by each of the first and second RFICs; applications supported by one or more connected networks; a network load of one or more of the connected networks; a cost of operating on one or more of the connected networks; relative ratio of commercial-network coverage to public-safety-network coverage; and a selection of a network from among the connected networks as a home network for the wireless-communication device.

13. The wireless-communication device of claim 1, wherein:
the first RFIC comprises the first carrier-aggregation circuit; and
in the carrier-aggregation mode, the wireless-communication device is operable to conduct carrier aggregation using the first carrier-aggregation circuit with respect to communications that are associated with the first network credential and that are conducted via the first RFIC.

14. The wireless-communication device of claim 13, wherein:
the baseband processor comprises a second carrier-aggregation circuit; and
in the carrier-aggregation mode, the wireless-communication device is operable to conduct carrier aggregation:
(i) using the first carrier-aggregation circuit with respect to communications that are associated with the first network credential and that are conducted via the first RFIC; and (ii) using the second carrier-aggregation circuit with respect to:
(a) communications aggregated by the first carrier-aggregation circuit, and
(b) communications that are associated with the first network credential and that are conducted via the second RFIC.

15. The wireless-communication device of claim 1, wherein:
the baseband processor comprises the first carrier-aggregation circuit; and
in the carrier-aggregation mode, the wireless-communication device is operable to conduct carrier aggregation using the first carrier-aggregation circuit with respect to (i) communications that are associated with the first network credential and that are conducted via the first RFIC and (ii) communications that are associated with the first network credential and that are conducted via the second RFIC.

16. The wireless-communication device of claim 1, further comprising a first network-credential module providing the first network credential and a second network-credential module providing the second network credential.

17. The wireless-communication device of claim 16, wherein the first network-credential module comprises a first subscriber identity module (SIM) and the second network-credential module comprises a second SIM.

18. The wireless-communication device of claim 1, further comprising a network-credential module providing both the first network credential and the second network credential.

19. The wireless-communication device of claim 18, wherein the network-credential module comprises a subscriber identity module (SIM).

20. A method carried out by a wireless-communication device that comprises (i) first and second RF integrated circuits (RFICs), (ii) a baseband processor coupled to the first RFIC and to the second RFIC, (iii) a first carrier-aggregation circuit, (iv) a fast-network-switching connection manager coupled to the baseband processor, and (v) a mode controller coupled to the baseband processor and to the fast-network-switching connection manager, the method comprising:
using the mode controller to selectively place the wireless-communication device in a carrier-aggregation mode or in a fast-network-switching mode;
if the mode controller places the wireless-communication device in the carrier-aggregation mode, responsively disabling the fast-network-switching connection manager and enabling at least the first carrier-aggregation circuit to be operable to conduct carrier aggregation with respect to communications that are associated with a first network credential and that are conducted via at least the first RFIC;
if the mode controller places the wireless-communication device in the fast-network-switching mode, responsively enabling the fast-network-switching connection manager to be operable to conduct fast network switching with respect to (i) communications that are associated with the first network credential and that are conducted via the first RFIC and (ii) communications that are associated with a second network credential and that are conducted via the second RFIC; and
communicating via at least the first RFIC according to the selected mode.

* * * * *